United States Patent
Kim et al.

(10) Patent No.: US 6,418,322 B1
(45) Date of Patent: Jul. 9, 2002

(54) METHOD FOR FORWARD POWER CONTROL IN CELLULAR SYSTEM

(76) Inventors: Gun Yeob Kim, 109-804, Samsung 4-cha Apt. Sooji-eup, Yongin-city, Kyungki-do 449-840; Pyeong Hwan Wee, 210Ho, 53-10 Okeum-dong, Songpa-gu, Seoul 138-130, both of (KR)

(*) Notice: Subject to any disclaimer, the term of this patent is extended or adjusted under 35 U.S.C. 154(b) by 0 days.

(21) Appl. No.: 09/360,917

(22) Filed: Jul. 26, 1999

(30) Foreign Application Priority Data

Jul. 30, 1998 (KR) .............................. 98-30790

(51) Int. Cl.[7] ................................ H04B 7/05
(52) U.S. Cl. ...................... 455/522; 455/69; 455/442
(58) Field of Search ....................... 455/522, 69, 442, 455/70, 92, 63, 127, 67.1, 517, 524, 507, 561, 239.1, 562, 504, 505, 38.3, 68, 232.1, 235.1; 375/130, 153; 370/332, 333

(56) References Cited

U.S. PATENT DOCUMENTS

| | | | | |
|---|---|---|---|---|
| 5,778,309 A | * | 7/1998 | Tuttle et al. | 455/127 |
| 5,893,035 A | * | 4/1999 | Chen | 455/522 |
| 5,960,361 A | * | 9/1999 | Chen | 455/522 |
| 6,038,220 A | * | 3/2000 | Kang et al. | 370/252 |
| 6,058,107 A | * | 5/2000 | Love et al. | 370/332 |
| 6,073,026 A | * | 6/2000 | Kim et al. | 455/522 |
| 6,144,841 A | * | 11/2000 | Feeney | |
| 6,148,207 A | * | 11/2000 | Baum et al. | 455/442 |
| 6,148,208 A | * | 11/2000 | Love | 455/442 |
| 6,151,508 A | * | 11/2000 | Kim et al. | 455/522 |
| 6,173,188 B1 | * | 1/2001 | Kim | 455/522 |

\* cited by examiner

*Primary Examiner*—Daniel Hunter
*Assistant Examiner*—Pablo N Tran
(74) *Attorney, Agent, or Firm*—Klauber & Jackson

(57) ABSTRACT

A method of forward power control in a cellular mobile telecommunication system having a base station and a mobile station, a base station receives an information about the quality of a forward link from a mobile station and controls the transmission power in the forward link. If information about the quality of the forward link is not obtained within a predetermined period due to deterioration in the forward link, the base station changes its parameters of the forward power control. As a result, the digital gain of transmission power of the forward link is increased to improve the deteriorated quality of the forward link and to carry out the forward power control. Simultaneously, the base station decreases the digital gain of transmission power more rapidly to saving a power consumption and to reduce interference to other radio channels.

19 Claims, 6 Drawing Sheets

METHOD FOR FORWARD POWER CONTROL IN CELLULAR SYSTEM

CLAIM OF PRIORITY

This application makes reference to, incorporates the same herein, and claims all benefits accruing under 35 U.S.C. §119 arising from an application entitled, METHOD FOR FORWARD POWER CONTROL IN CELLULAR SYSTEM, earlier filed in the Korean Industrial Property Office on Jul. 30, 1998, and there duly assigned Ser. No. 1998-30790.

BACKGROUND OF THE INVENTION

1. Field of the Invention

The present invention relates to a cellular radio communication system, and more particularly, to a method for controlling the transmission power of a forward link to improve a call drop rate caused by a deterioration in the forward link in a code division multiple access (CDMA) system.

2. Description of the Related Art

In a cellular radio telecommunication system, the whole coverage area is divided into areas of a plurality of base stations (BSs) and a plurality of cells. The base stations are controlled by a mobile switching center MSC for allowing many subscribers to maintain a call while they are moving between the cells.

FIG. 1 illustrates a configuration of a conventional cellular radio communication system. It includes base stations (BSs) (200, 300 and 400) for providing a mobile communication services to a mobile station (MS) (100), and a mobile switching center (MSC) (500) for connecting the (BSs) (200, 300 and 400) to a public switched telephone network PSTN 600.

In the cellular system as illustrated in the FIG. 1, a forward link is directed from a base station to a mobile station, and a reverse link is directed from a mobile station to a base station. In a radio communication, a transmission power is controlled in order to suppress the transmission power. The power control is used to adjust the transmit power of the base station for each traffic channel. When the mobile station is affected by the signals traveling through propagation paths or other multi-path characteristic interference, the transmission power control is performed such that the received power levels of signals transmitted from the mobile stations and received by the base station, or the SIR (Signal-to-interference power ratio) associated with the received power levels are kept constant at the base station. By means of this forward power control, there is provided a saving of power consumption and a reduction of interference to other radio channels.

It will be appreciated by those skilled in the relevant art based on the detailed description provided herein that in a typical forward power control known in the art include a mobile station unit for measuring the quality of a communication signal received by the mobile station from a base station and a unit for producing a base station transmission power control data/forward power control signal, and the base station include a unit for measuring a receiving the forward power control signal, a unit for calculating a power level command based on the received forward power control signal, and a unit for producing a mobile station transmission power control data specifying a mobile station transmission power in accordance with the received.

Typically, a base station and a mobile station transmit a voice signal or a control signal in the frame unit of 20 ms. Each frame has error check bits known as cyclic redundancy checks (CRC). The mobile station checks for the error check bits in a forward frame received from the base station and determines whether the forward frame contains an error or not. At a data rate of 8 kbps, the mobile station periodically or when the number of non-proper frames received from the base station falls under a predetermined threshold value transmits a power measurement report message (PMRM) as a forward power control signal. The PMRM contains information about the quality of a forward link, i.e. the total number of properly received or non-properly received forward frames that the mobile station received from the base station. Using the PMRM, the base station adjusts its digital gain in the parameter to increase or decrease the transmit power at a predetermined level, which is indispensable in the CDMA scheme, as a reduction of an amount of interference with other radio channels can directly lead to an increase of a subscriber capacity. This procedure is referred as a Forward Power Control.

FIG. 2 illustrates a graph representing the forward power control as known in the prior art. As shown in the FIG. 2, a base station establishes a call with a mobile station and transmits a transmission power to the mobile station with a digital gain indicated as a nominal gain. Then, the base station starts to gradually decrease the transmission power. In other words, the base station gradually decreases the digital gain to reduce the transmission power at a decrement, referred as a "slow down delta" in FIG. 2, starting from the peak of the nominal gain for every "slow down time."

If a power measurement report message (PMRM) is not received from the mobile station during the first slow down time, the process of gradually decreasing the digital gain is repeated for a predetermined number of times, three times as shown in FIG. 2, the base station starts to rapidly decrease the digital gain to reduce the transmission power at another decrement, referred to as a "fast down delta" in FIG. 2, for "fast down time," repeatedly.

However, if the decreased digital gain is equal to a predetermined minimum gain, referred to as "floor one way" in FIG. 2., in either the slow down procedure or the fast down procedure, the base station ceases to further decrease the digital gain and maintains the digital gain at a predetermined minimum gain.

Meanwhile, the mobile station checks continually for the forward frames received from the base station and determines whether the forward frames have an error or not. Then, the mobile station informs the base station of the number of the forward frames and the number of forward bad frames via a power measurement report message (PMRM) periodically, or whenever the number of forward bad frames reaches at a predetermined threshold of bad frames ($PWR_{13}$ REPT_THRESH).

If the PMRM is received by the base station via a reverse link during the slow down procedure or the fast down procedure, the base station calculates a frame error rate (FER) of the forward link, using the number of all forward frames and the number of bad forward frames as indicated in the PMRM.

If the calculated forward frame error rate exceeds the predetermined threshold of forward frame error rate (FER_THRESHOLD), the base station increases the digital gain of the base station to increase the transmission power by an increment, represented as "big up delta" at P10 in FIG. 2. Similarly, if the calculated forward frame error rate does not exceeds the FER_THRESHOLD, the base station increases the digital gain of transmission power by an increment, represented as "small up delta" at P20 in FIG. 2.

Accordingly, after the digital gain is increased either by the "big up delta" or the "small up delta," the base station decreases the digital gain according to the same slow down procedures and the fast down procedures described early. Whenever the power measurement report message is received from a mobile station, the base station adjusts the digital gain to increase or decrease the transmission power according to the newly received PMRM to carry out the forward power control.

Despite of performing such a forward power control, the quality of forward link is always susceptible to interference causing the mobile station to receive the forward frames having errors therein. As shown in FIG. 3, if 12 bad frames were received continuously for the duration of 240 ms (P1) after a call is established with a base station, the mobile station then stops outputting transmission power and enters into OFF mode.

If two good frames were not received within 5 seconds continuously, the mobile station releases the established call at P2 as shown in FIG. 3. However, if the mobile station in the OFF mode (between P1~P2) receives two good forward frames in sequence, the mobile station restarts outputting transmission power again.

As stated above, if the mobile station stops outputting transmission power and does not transmit any information via a reverse link, the base station cannot receive any power measurement report message (PMRM) including an information about frame error rate of the forward link. Then, the base station cannot receive any information about the quality of ongoing forward link, causing the base station to falsely believe that the forward link does not have an error, and continuously decrease the digital gain of transmission power to yield more deterioration in the forward link.

SUMMARY OF THE INVENTION

It is a primary object of the present invention to provide a forward power control employed in cellular system, and to make a base station to adjust the parameter to transmit power that enables the mobile station to restart outputting a Power Measurement Report Message (PMRM) in case when the mobile station has ceased to output the PMRM due to a deterioration in the forward link.

Another object of the present invention is to provide a forward power control method in cellular system so as to make the base station to rapidly decrease the transmission power after the mobile station has restarted to output the PMRM due to the power improvement in the forward link.

In one aspect of the inventions, a method for improving forward power control by in cellular mobile telecommunication system having a plurality of base stations and at least one mobile station, the method comprising the steps of:

a step (a) of establishing a call between the mobile station and the base station and transmitting a transmission power with a nominal gain as a digital gain via a forward link from the base station to the mobile station, and determining a signal quality on the forward link via one of a Power Measurement Report Message (PMRM) from the mobile station to the base station;

a step (b) of gradually decreasing the digital gain of the base station at a first slow-down power decrement every first slow-down time interval;

a step (c) of rapidly decreasing the digital gain of the base station at a first fast-down power decrement every first fast-down time interval if the PMRM is not received by the base station via a reverse link until the step (b) is repeated specific times;

a step (d) of changing the parameters of the forward power control by the base station if the PMRM is not received from the mobile station within the predetermined period and increasing the digital gain by a first power increment;

a step (e) of determining a frame error rate of the forward link if the PMRM is received by the base station from the mobile station responsive to the changed parameter of the forward power control, and comparing the determined frame error rate to a predetermined threshold value of frame error rate;

a step (f) of increasing the digital gain of the base station by the first power increment responsive to the changed parameter of the forward power control if the determined frame error rate is same or larger than the threshold value of frame error rate, gradually decreasing the digital gain of the base station at a second slow-down power decrement every second slow-down time interval, and rapidly decreasing the digital gain of the base station at a second fast-down power decrement every second fast-down time interval; and, a step (g) of increasing the digital gain of the base station by a second power increment responsive to the changed parameter of the power control if the determined frame error rate is smaller than the threshold value of frame error rate, gradually decreasing the digital gain of the base station at a third slow-down power decrement every third slow-down time interval, and rapidly decreasing the digital gain of the base station at a third fast-down power decrement every third fast-down time interval, wherein the second power increment is smaller than the first power increment.

Another aspect of the present invention is to provide a method for improving forward power control in cellular mobile telecommunication system, the method comprising the steps of:

establishing a call between a mobile station and a base station and transmitting a transmission power by the base station via a forward link to the mobile station;

controlling forward power by decreasing a digital gain of the base station and increasing the digital gain according to an information about the quality of the forward link received from the mobile station;

checking forward frames received from the base station to the mobile station via the forward link and transmitting an information about the quality of the forward link as the checking result from the mobile station to the base station;

changing the parameters of the forward power control at the base station if an information about the quality of the forward link is not received by the mobile station within a predetermined period;

increasing the digital gain of the base station responsive to the changed parameter of the forward power control in order to receive the information from the mobile station; and, decreasing the digital gain of the base station responsive to the changed parameters.

DESCRIPTION OF THE PREFERRED EMBODIMENTS

In a cellular system, a mobile station periodically informs a base station about a number of forward frames as well as the bad frames with an error through a power measurement report message (referred as PMRM hereinafter) wherein the period is 1120 ms, i.e. 56 frames. Also, whenever the number of bad frames that mobile station receives reaches a predetermined number of bad frames (PWR_REPT_THRESH), the mobile station sends such information via PMRM to the base station.

If the mobile station does not receive a transmitting signal via the forward link, the mobile station enters into OFF mode and is unable to transmit the PMRM to the base station. The mobile station remains in the OFF mode throughout 5 seconds if two good frames are not received consecutively, and as a result, the forward link is getting worse. In accordance with the present invention, if a PMRM is not received from the mobile station within the time corresponding to 56 frames, then the base station changes the power control parameters in order to increase the digital gain to increase the transmission power assigned to the mobile station.

If the base station increases the digital gain of base station, then the forward link is improved and the mobile station can then receive good forward frames via the improved forward link. The mobile station then restarts to output a new transmission power to the base station and send the PMRM after receiving two good frames, continuously. As a result, the base station can perform a forward power control using the PMRM received from the mobile station.

The base station derives a frame error rate using the power measurement report message and compares to a predetermined threshold of frame error rate. If calculated frame error rate exceeds the predetermined threshold error rate, a digital gain for the transmission power is increased by a 'big up delta,' and if not, the digital gain is only increased by a 'small up delta,' wherein the 'big up delta' is greater than the 'small up delta.'

Since the sum of transmission power assigned to total mobile stations to a given base station is restricted in a mobile communication system, the digital gains assigned to the other mobile stations are decreased if a digital gain assigned to one mobile station is increased. Accordingly, after the mobile station restarts outputting more transmission power and transmits the PMRM, the base station has to rapidly reduce the increased digital gain in order to balance the whole capacity of the base station and doesn't cause any interference to other mobile stations.

Figure 1:
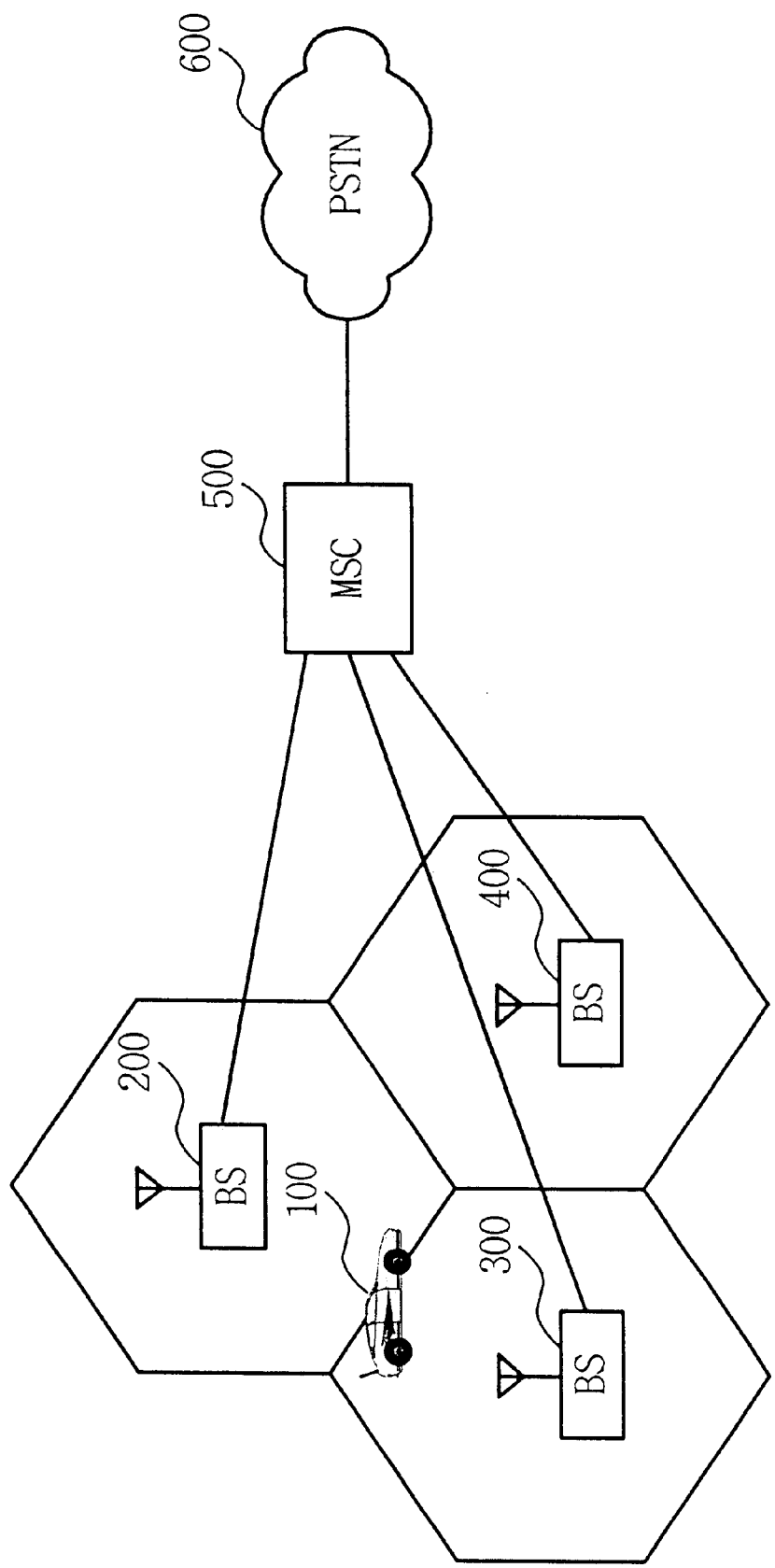
FIG. 1 illustrates a schematic diagram for a conventional cellular system.
Figure 2:
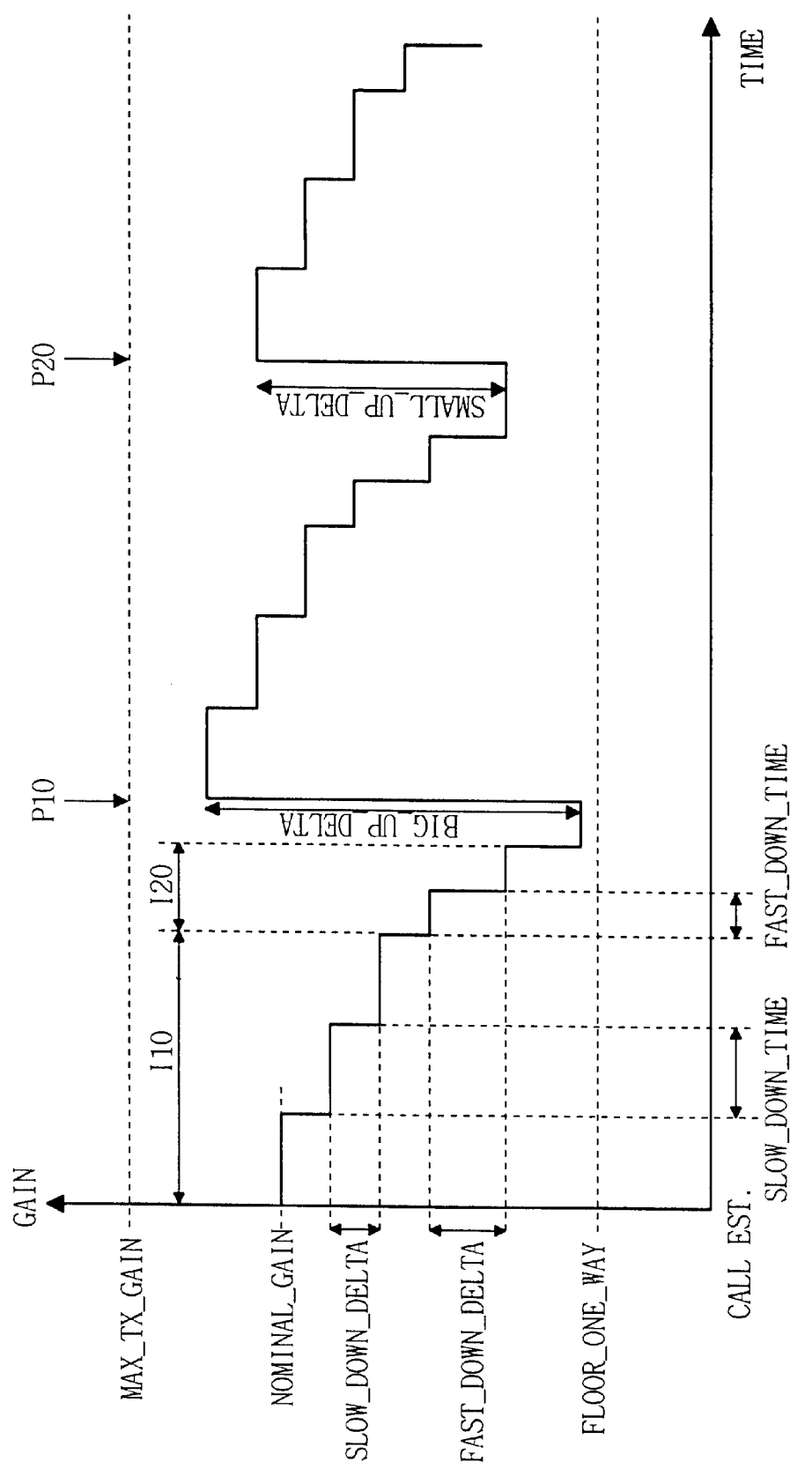
FIG. 2 illustrates a graph representative of a power gain process as in the prior method employed in a forward power control.
Figure 3:
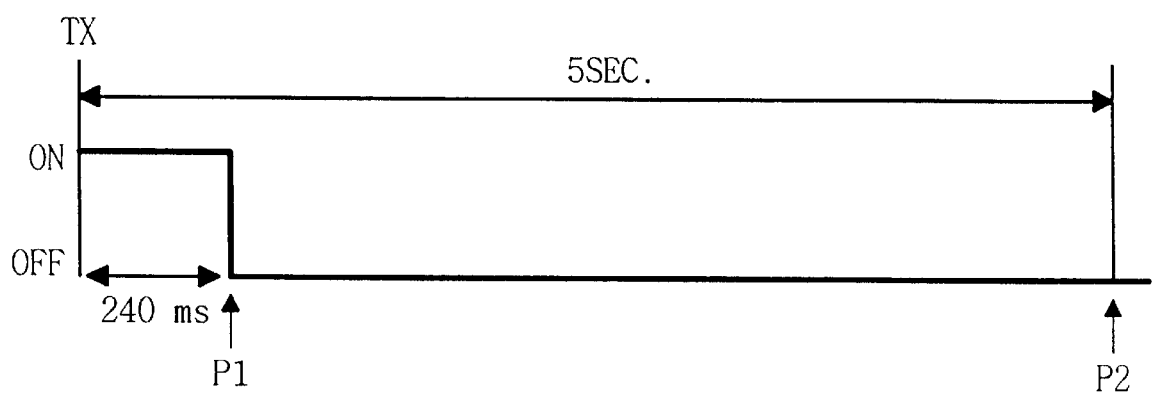
FIG. 3 is a timing diagram illustrating the required time range in outputting the transmission power by a mobile station in cellular system.
Figure 4:
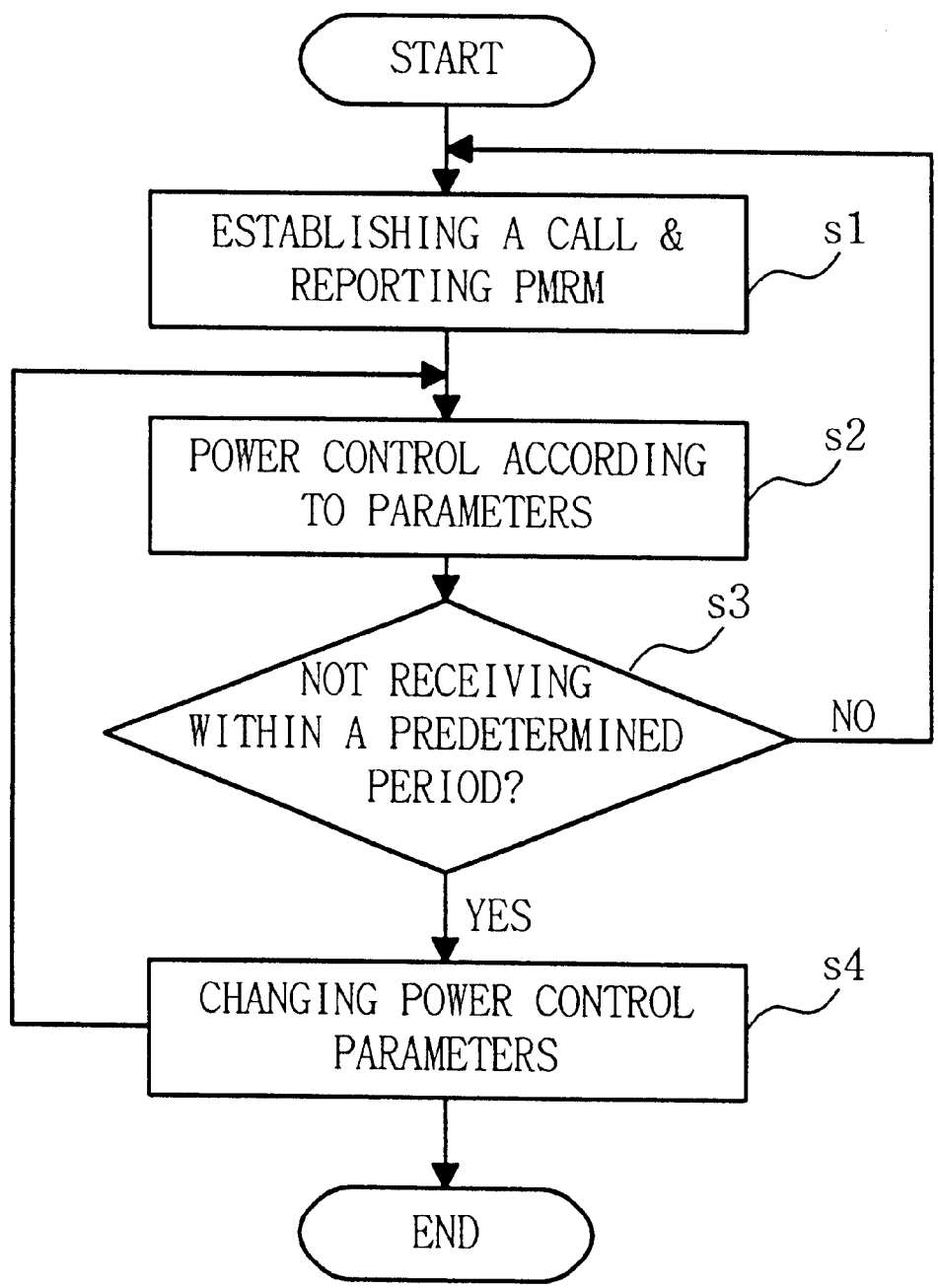
FIG. 4 is a flow chart illustrating a preferable embodiment of method of forward power control according to the present invention.
Figure 5:
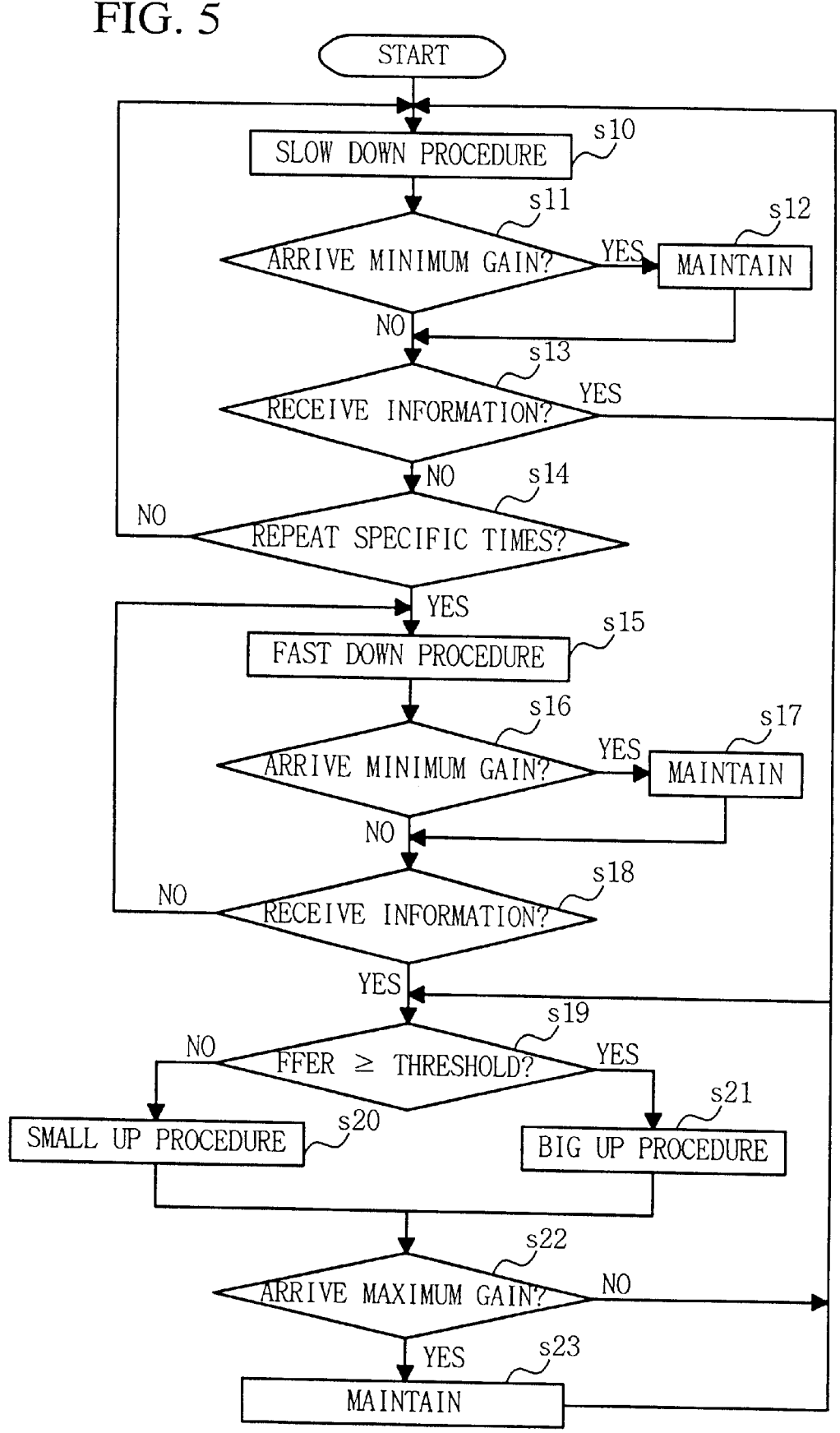
FIG. 5 is a detailed flow chart illustrating the steps in accordance with the present invention; and, FIG. 6 is a graph representing a power gain for forward power control according to the embodiment of the present invention.

FIG. 4 illustrates a flow chart of a method for forward power control according to the present invention, and FIG. 5 illustrates a detailed flow chart illustrating the power control method according to the FIG.4. The method according to the present invention includes a step (s1) of establishing a call between a base station and a mobile station and reporting at the mobile station a PMRM to the base station periodically or non-periodically, a step (s2) of controlling the forward power control according to parameters in the received PMRM, a step (s3) of checking further whether a PMRM is received to the base station within a predetermined time, and a step (s4) of changing the parameters and returning to the step (s2).

Figure 6:
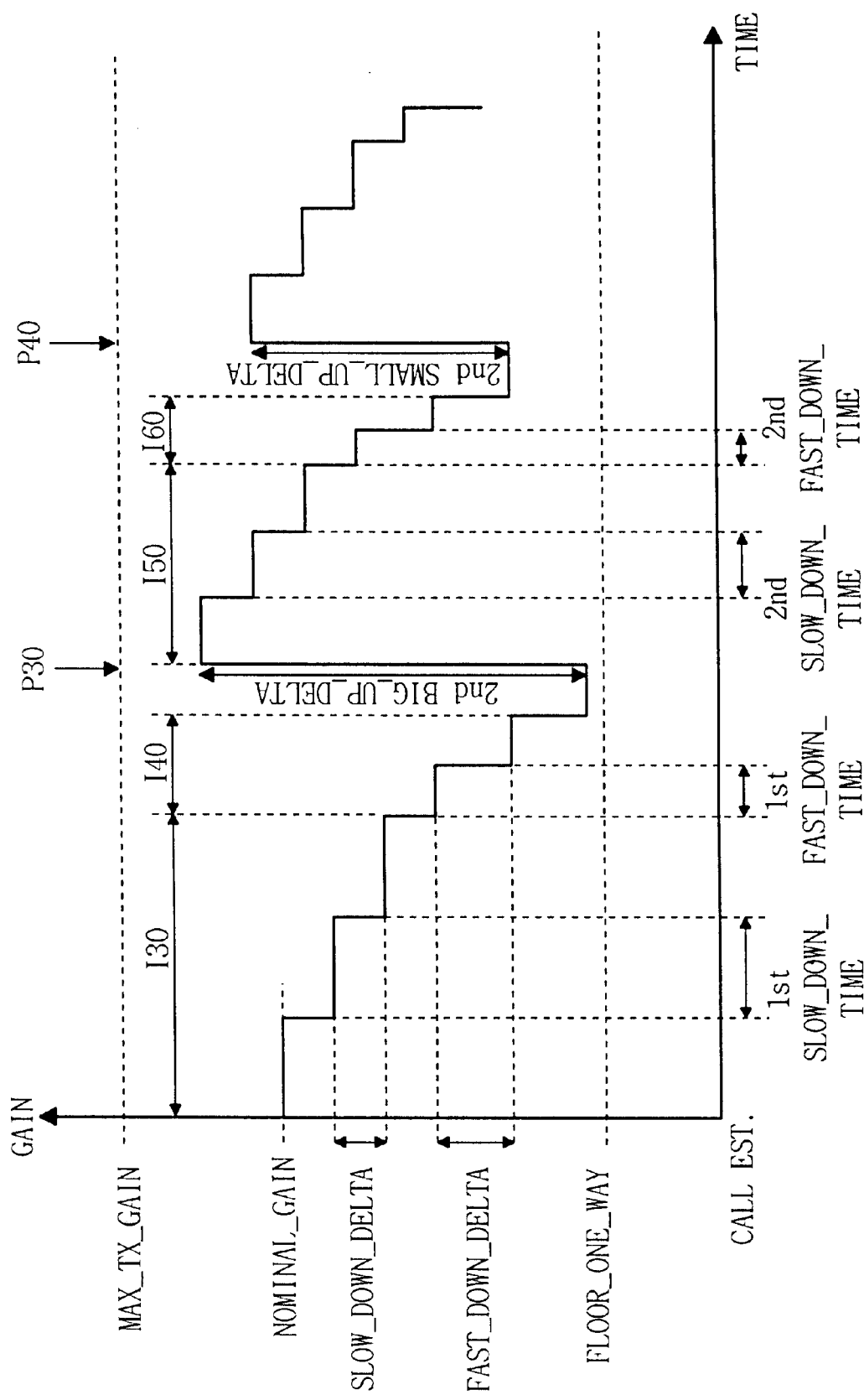

FIG. 6 illustrates a graph showing a various digital gain of the forward power control according to the present invention. In step (s1), a base station transmits a power at a digital gain level of a nominal gain after establishing a call with a mobile station. In step (s10), the base station gradually decreases the digital gain of the nominal gain to reduce the transmission power. That is, the base station gradually decreases the digital gain of the base station at a decrement of a "first slow delta" from the nominal gain at the repetitive interval of "first slow down time."

If the PMRM is not received from the mobile station during the fast slow-down time for a predetermined times, then the base station rapidly decreases the digital gain of the transmission power by a decrement of "first fast down delta" at the repetitive interval of "first fast down time" in step (s15). However, in step (s16), if the decreased digital gain is equal to a minimum gain, referred to as "floor one way" in FIG. 6, in either duration of the first slow-down time or the first fast-down time, the base station ceases to further decrease the digital gain and maintains the digital gain at a minimum gain.

If the mobile station stops outputting transmission power as a result of receiving bad frames continuously, then the base station cannot receive any PMRM from the mobile station to carry out the forward power control. If the PMRM is not received from the mobile station within a predetermined period, then the base station changes its parameter to increase the digital gain to increase the transmission power by "second big up delta" at P30 so that the mobile station can receive the forward frames and transmit the PMRM to the base station, wherein the "second big up delta" is larger than the "first big up delta." That is, the first big up delta has been applied prior to receiving the PMRM within the predetermined period.

Since the digital gain cannot exceed a maximum gain, the base station does not increase the digital gain any further and maintains the second digital gain below or at the maximum gain if the increased digital gain approaches the maximum gain.

If the quality of a forward link is improved according to the increase in the digital gain of the base station, the mobile station is able to receive two good forward frames consecutively and restart outputting transmission power and the PMRM.

Thereafter, the base station derives a frame error rate using the power measurement report message and compares to a predetermined threshold of frame error rate. A digital gain for the transmission power is increased by a 'second big up delta,' if the calculated frame error rate exceeds the predetermined threshold of frame error rate. If the calculated frame error rate does not exceeds the predetermined threshold error rate, the digital gain is only increased by a 'small up delta,' wherein the digital gain for the 'big up delta' is greater than the 'small up delta.'

Because a sum of transmission power in a base station is fixed, whole capacity of transmission power of the base station can be deteriorated, if the base station increases the digital gain of a channel assigned to one mobile station to be greater than that the digital gain assigned to other mobile stations.

Consequently, after the digital gain is increased by the "second big up delta" or to the maximum gain, the base station begins to decrease the digital gain more rapidly, in step (s10) or step (s15). At this time, the base station changes values of "slow down time" and "fast down time" from 1600 ms to 800 ms and decreases the digital gain according to the changed values more rapidly.

In other words, the base station decreases the digital gain by "second slow-down delta" for every interval of "second slow-down time" in step (s10), wherein the time duration of "second slow-down time" is shorter than the "first slow-down time."

Thereafter, if another PMRM is not received from the mobile station until such second slow-down procedure has been performed repeatedly for the predetermined number of times, then the base station decreases the digital gain of the transmission power by "second fast down delta" during time interval of "second fast down time (I60)" in step (s15).

Similar to the second slow down procedure, the time duration of "second fast down time" is smaller than the "first fast down time." If the gradual reduction in the second digital gain reaches a minimum gain ("floor one way") during the second slow-down down procedure (s10) or second fast-down procedure (s15), the base station ceases to go below the minimum gain, and maintains the digital gain at the minimum gain in step (s12) or (s17).

As stated above, if a forward link is getting worse and an information about the quality of the forward link is not received from a mobile station within a predetermined period, a base station changes its parameters of the forward power control and improves the forward link. Mainly, the changed parameters include 'slow-down time', 'fast-down time,' and a 'big up delta'. The base station may also change other parameters for recovering the transmission quality of forward link more rapidly.

As an example, the followings are shown parameters of forward power control in comparison to the prior art, which can be changed according to the present invention.

i) A "slow down time" refers to time interval for decreasing a digital gain in a slow down procedure. The "slow down time" is changed to 800 ms from 1600 ms.

ii) A "fast down time" is a time for decreasing a digital gain in a fast down procedure. The "fast down time" is changed to 800 ms from 1600 ms.

iii) A "nominal gain" is a value of a digital gain of transmission power when a call established. The "nominal gain" is changed to 100 from 60.

iv) A "maximum gain" is a maximum value for increasing a digital gain. The "maximum gain" is changed to 127 from 90.

v) A "threshold of frame error rate" is a threshold value for determining how a digital gain is increased. The "threshold of frame error rate" is changed to 2% from 6%.

vi) A "threshold of bad frames" is the number of forward bad frames being the criteria for determining whether a power measurement report message is transmitted. The "threshold of bad frames" is changed to 4 from 7.

vii) A "big up delta" is a value for increasing a digital gain in a big up procedure. The "big up delta" is changed to 20 from 10.

viii) A "small up delta" is a value for increasing a digital gain in a small up procedure. The "small up delta" is changed to 10 from 5.

As stated in the above, if a base station is not receiving a power measurement report message from a mobile station within a predetermined period, the base station changes values of forward power control parameters in order to improve the transmission of signals in a forward link. The changed values of parameters are applied so that the corresponding mobile station can receive PMRM, and the base station can then perform the forward power control.

In other words, if a mobile station enters an OFF mode after being unable to receive forward frames via a forward link, the base station increases a digital gain of transmission power for making the mobile station to withdraw from the OFF mode and restart outputting transmission power. Thus, although many bad forward frames are appeared because of an aggravation in the quality of a forward link, a forward power control can be performed normally. If the forward link is getting better and a power measurement report message is received, the base station decreases the increased digital gain more rapidly for balancing the whole power capacity of the system. As a result, the present invention improves a call drop rate, minimizes errors in the forward power control, and improves the quality of a telephone conversation.

What is claimed is:

1. A method for improving forward power control by in cellular mobile telecommunication system having a plurality of base stations and at least one mobile station, said method comprising the steps of:

a step (a) of establishing a call between said mobile station and said base station and transmitting a transmission power with a nominal gain as digital gain via forward link from said base station to said mobile station, and determining a signal quality on said forward link via one of a Power Measurement Report Message (PMRM) from said mobile station to said base station;

a step (b) of gradually decreasing said digital gain of said base station at a first slow-down decrement for every first slow-down time interval;

a step (c) of rapidly decreasing said digital gain of said base station at a first fast-down decrement for every first fast-down time interval if said PMRM is not received by said base station via a reverse link;

repeating said step (b) and said step (c) for a predetermined time;

a step (d) of changing the parameters of said forward power control by said base station if said PMRM is not received from said mobile station within said predetermined period;

a step (e) of determining a frame error rate of said forward link if said PMRM is received by said base station from said mobile station responsive to said changed parameter of said forward power control, and comparing said determined frame error rate to a predetermined threshold value of frame error rate;

a step (f) of increasing said digital gain of said base station by a first power increment responsive to said changed parameter of said forward power control if said determined frame error rate is same or larger than said threshold value of frame error rate, gradually decreasing said second power level of said base station at a second slow-down increment during a second slow-down time interval, and rapidly decreasing said digital gain by said first power increment at a second fast-down power decrement for every second fast-down time interval; and, a step (g) of increasing said digital gain of said base station by a second power increment responsive to said changed parameter of said power control if said determined frame error rate is smaller than said threshold value of frame error rate gradually decreasing said digital gain by said second power increment at a third slow-down power increment for every third slow-down time interval, and rapidly decreasing said digital gain by said second power increment at a third fast-down power decrement for every third fast-down time interval, wherein said second power increment is smaller than said first power increment.

2. The method as set forth in claim 1, wherein said digital gain of base station is maintained between a minimum gain and a maximum gain.

3. The method as set forth in claim 1, wherein each said first slow-down power decrement is smaller than said first fast-down power decrement and the duration of said first slow-down time interval is longer than the duration of said first fast-down time interval.

4. The method as set forth in claim 3, wherein each said second slow-down power decrement is smaller than said second fast-down power decrement, and the duration of said second slow-down time interval is shorter than the duration of said second fast-down time interval.

5. The method as set forth in claim 4, wherein the duration of said second slow-down time interval and said second fast-down time interval are shorter than the duration of said slow-down time interval and said first fast-down time interval, respectively.

6. The method as set forth in claim 5, wherein the duration of said second slow-down time interval and said second fast-down time interval are about one half of the duration of said first slow-down time interval and said first fast-down time interval, respectively.

7. The method as set forth in claim 1, wherein each said third slow-down power decrement is smaller than said third fast-down power decrement and the duration of said third slow-down time interval is smaller than said third fast-down time interval.

8. The method as set forth in claim 7, wherein the duration of said third slow-down time interval and said third fast-down time interval is shorter than the duration of said first slow-down time interval and said first fast-down time interval, respectively.

9. The method as set forth in claim 8, wherein the duration of said third slow-down time interval and said third fast-down time interval are about one half of the duration of said first slow-down time interval and said first fast-down time interval, respectively.

10. The method as set forth in claim 1, wherein said mobile station transmits said PMRM, periodically.

11. The method as set forth in claim 1, wherein said step of changing the parameter of said forward power control comprises the step of decreasing said threshold value of frame error rate in said parameter.

12. The method as set forth in claim 1, wherein said step of changing the parameter of said forward power control comprises the step of increasing said maximum gain in said parameter.

13. The method as set forth in claim 12, wherein said step of changing the parameter of said forward power control comprises the step of increasing said nominal gain in said parameter.

14. The method as set forth in claim 1, wherein said step of changing the parameter of said forward power control comprises the step of decreasing a threshold of bad frames in said parameter, wherein said threshold of bad frames is provided to transmits said PMRM from said mobile station to said base station non-periodically.

15. A method for improving forward power control by in cellular mobile telecommunication system, said method comprising the steps of:

(a) establishing a call between a mobile station and a base station and transmitting a transmission power by said base station to said mobile station via a forward link;

(b) checking forward frames received from said base station to said mobile station via said forward link and transmitting a forward power control signal from said mobile station to said base station wherein said forward power control signal provides an information about quality of said forward link;

(c) controlling forward transmission power by increasing or decreasing a digital gain of said base station according to said forward power control signal received from said mobile station to said base station;

(d) changing parameters of said forward power control at said base station if said forward power control signal is not received by said base station from said mobile station within a predetermined period;

(e) increasing said digital gain of said base station responsive to said changed parameter of said forward power control in order to receive said forward power control signal from said mobile station; and, (f) decreasing said digital gain of said base station responsive to said changed parameters.

16. The method as set forth in claim 15, wherein said step (d) of changing parameters for said forward power control comprises the step of shortening a decrement rate by which said digital gain is decreased.

17. The method as set forth in claim 15 further comprises the step of determining a frame error rate of said forward link if said forward power control signal is received by said base station from said mobile station and comparing said determined frame error rate to a predetermined threshold value.

18. The method as set forth in claim 17 further comprises the step of increasing said digital gain of said base station by a first power increment according said changed parameter of said forward power control if said determined frame error rate is same or larger than said threshold value.

19. The method as set forth in claim 17 further comprises the step of increasing said digital gain of said base station by second power increment according to said changed parameter of said power control if said determined frame error rate is less than said threshold value.

* * * * *

UNITED STATES PATENT AND TRADEMARK OFFICE
CERTIFICATE OF CORRECTION

PATENT NO.     : 6,418,322 B1                                          Page 1 of 1
DATED          : July 9, 2002
INVENTOR(S)    : Gun Yeob Kim and Pyeong Hwan Wee It is certified that error appears in the above-identified patent and that said Letters Patent is hereby corrected as shown below:

<u>Title page,</u>
Item [73], the patent should reflect the following as assignee:

-- Samsung Electronics Co., Ltd.
416, Maetan-Dong
Paldal-Gu, Suwon-City
Kyungki-do, Korea
Republic of Korea --

Signed and Sealed this

Twenty-ninth Day of October, 2002

*Attest:*

*Attesting Officer*

JAMES E. ROGAN
*Director of the United States Patent and Trademark Office*